US012474991B2

(12) United States Patent
Araújo et al.

(10) Patent No.: US 12,474,991 B2
(45) Date of Patent: Nov. 18, 2025

(54) CONTROLLING CONCURRENT EXECUTION OF PERCEPTION ALGORITHMS

(71) Applicant: Telefonaktiebolaget LM Ericsson (publ), Stockholm (SE)

(72) Inventors: José Araújo, Stockholm (SE); Roberto Morabito, Helsinki (FI); Paula Carbó Cubero, Sundbyberg (SE); Elisa Baldassari, Unterengstringen (CH); Sandra Hernandez, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 31 days.

(21) Appl. No.: 18/714,851

(22) PCT Filed: Dec. 2, 2021

(86) PCT No.: PCT/EP2021/083978
§ 371 (c)(1),
(2) Date: May 30, 2024

(87) PCT Pub. No.: WO2023/098999
PCT Pub. Date: Jun. 8, 2023

(65) Prior Publication Data
US 2025/0028591 A1 Jan. 23, 2025

(51) Int. Cl.
*G06F 11/00* (2006.01)
*G06F 11/07* (2006.01)
*G06F 17/18* (2006.01)

(52) U.S. Cl.
CPC ........ *G06F 11/079* (2013.01); *G06F 11/0721* (2013.01); *G06F 17/18* (2013.01)

(58) Field of Classification Search
CPC ..... G06F 11/079; G06F 11/0721; G06F 17/18
See application file for complete search history.

(56) References Cited

U.S. PATENT DOCUMENTS 6,528,901 B1 * 3/2003 Canter ................ G06F 11/2025
307/11
9,450,875 B1 * 9/2016 Tong ..................... H04L 47/125
(Continued)

FOREIGN PATENT DOCUMENTS

| WO | 2017067856 A1 | 4/2017 |
| WO | 2017112866 A1 | 6/2017 |

OTHER PUBLICATIONS

Baldassari, Elisa, "Cross-layer optimization for joint visual-inertial localization and object detection on resource-constrained devices", Degree Project in Computer Science and Engineering, Second Cycle, 30 Credits, Stockholm, Sweden, Jun. 28, 2021, 124 pages.
(Continued)

*Primary Examiner* — Jonathan D Gibson
(74) *Attorney, Agent, or Firm* — Murphy, Bilak & Homiller, PLLC

(57) ABSTRACT

A mobile computing device (MCD, 100) for controlling concurrent execution of perception algorithms is provided, comprising network interface circuitry and processing circuitry. The MCD is operative to acquire (202) sensor data from one or more sensors, representing a physical environment in which the MCD is located, execute (203) an application which is dependent on one or more perception algorithms processing the sensor data, the perception algorithm(s) being subject to respective perception-performance constraints and a power-consumption constraint, determine (204) operating conditions of the MCD which have an impact on perception performance and power consumption of the perception algorithm(s), estimate (205) a level of contention for a local computing resource on which at least one of the perception algorithms and the application, or at least two of the perception algorithms, can be executed concurrently, estimate (207) a probability of failure for at least one of the perception algorithm(s) based on the esti-
(Continued)

mated level of contention, respective current configurations of the perception algorithm(s), a current configuration of the local computing resource, and the determined operating conditions, and if (208) the estimated probability of failure exceeds a failure threshold, offload (210) execution of the at least one perception algorithm to an external computing resource (130), else (208) execute (231) the at least one perception algorithm on the local computing resource.

20 Claims, 3 Drawing Sheets

(56) References Cited

U.S. PATENT DOCUMENTS

| | | | |
|---|---|---|---|
| 2005/0055590 A1 | 3/2005 | Farkas et al. | |
| 2008/0163255 A1* | 7/2008 | Munoz | G06F 11/2028 719/318 |
| 2014/0143465 A1* | 5/2014 | Mealey | G06F 9/4856 710/200 |
| 2014/0380297 A1* | 12/2014 | Madl, III | G06F 8/656 717/171 |
| 2015/0227391 A1 | 8/2015 | Paul et al. | |
| 2016/0283284 A1 | 9/2016 | Sun et al. | |
| 2022/0114055 A1* | 4/2022 | Doshi | G06F 11/1492 |
| 2022/0342688 A1* | 10/2022 | Hernandez | G06F 9/5077 |

OTHER PUBLICATIONS

Chen, Tianqi, et al., "XGBoost: A Scalable Tree Boosting System", Proceedings of the 22nd ACK SIGKDD International Conference on Knowledge Discovery and Data Mining, 2016, 785-794.

Hernández Herrero, Sandra, "Cross-layer optimization for visual-inertial localization on resource-constrained devices", Degree Project in Electrical Engineering, Second Cycle, 30 Credits, Stockholm, Sweden, May 6, 2021, 96 pages.

Kelly, Jessica Ivy, "Runtime cross-layer optimization for visual-inertial localization on resource-constrained devices", Degree Project in Computer Science and Engineering, Second Cycle, 30 Credits, Stockholm, Sweden, Jun. 28, 2021, 99 pages.

Nguyen, Quang-Huy, et al., "A smartphone perspective on computation offloading—A Survey", Computer Communications, vol. 159, 2020, 133-154.

Shamsa, Elham, et al., "Concurrent Application Bias Scheduling for Energy Efficiency of Heterogeneous Multi-Core platforms", IEEE Transactions on Computers, 2021, 1-13.

Van Beek, Vincent, et al., "A CPU Contention Predictor for Business-Critical Workloads in Cloud Datacenters", 2019 IEEE 4th International Workshops on Foundations and Applications of Self* Systems (FAS*W), 2019, 56-61.

* cited by examiner

CONTROLLING CONCURRENT EXECUTION OF PERCEPTION ALGORITHMS

TECHNICAL FIELD

The invention relates to a mobile computing device for controlling concurrent execution of perception algorithms, a method of controlling concurrent execution of perception algorithms, a corresponding computer program, a corresponding computer-readable data carrier, and a corresponding data carrier signal.

BACKGROUND

Mobile computing devices such as autonomous vehicles and robots, Virtual-Reality (VR), Augmented-Reality (AR), Mixed-Reality (MR), or extended-Reality (XR), devices, typically rely on perception algorithms to localize themselves, and/or interact with objects, in their physical environments. Machine perception is the capability of a computer to interpret data in a manner that is similar to the way humans use their senses to relate to the world around them.

Perception algorithms, such as localization algorithms, mapping algorithms, localization-and-mapping algorithm (e.g., SLAM), object-detection algorithms, object-classification algorithms, segmentation algorithms, scene-recognition algorithms, gesture-recognition algorithm, or 3D-reconstruction algorithms, process sensor data captured by one or more sensors which are moving with the mobile computing device. Examples of such sensors include visual sensors, such as monocular cameras, stereo cameras, or multiple-camera systems, depth sensors, such as Lidar, and inertial sensors, such as Inertial Measurement Units (IMUs) which are composed of an accelerometer and a gyroscope. Depending on the number and types of sensors which are available to a mobile computing device, several perception algorithms may be executed concurrently.

It has been observed that executing perception algorithms on more powerful computing platforms generally reduces the probability of a failure of the perception algorithms, and also the loss in perception performance, e.g., localization accuracy, reliability of object detection or classification, detection speed, etc. The probability of failure and the perception performance also depends on the respective configurations of the perception algorithms (e.g., number of objects to detect, sampling frequency, number of iterations, convergence criteria, quantization, etc), the physical environment in which the mobile computing device is operating (e.g., lighting conditions, texture of the environment, etc), as well as operating conditions of the mobile computing device (e.g., its velocity).

While solutions for managing concurrently executed algorithms are known in general, there is need for solutions which are tailored to concurrently executed perception algorithms.

SUMMARY

It is an object of the invention to provide an improved alternative to the above techniques and prior art.

More specifically, it is an object of the invention to provide improved solutions for controlling concurrent execution of perception algorithms.

These and other objects of the invention are achieved by means of different aspects of the invention, as defined by the independent claims. Embodiments of the invention are characterized by the dependent claims.

According to a first aspect of the invention, a mobile computing device for controlling concurrent execution of perception algorithms is provided. The mobile computing device comprises network interface circuitry and processing circuitry. The mobile computing device is operative to acquire sensor data from one or more sensors. The acquired sensor data represents a physical environment in which the mobile computing device is located. The mobile computing device is further operative to execute an application which is dependent on one or more perception algorithms processing the acquired sensor data. The one or more perception algorithms are subject to respective perception-performance constraints and a power-consumption constraint. The mobile computing device is further operative to determine operating conditions of the mobile computing device which have an impact on perception performance and power consumption of the one or more perception algorithms. The mobile computing device is further operative to estimate a level of contention for a local computing resource on which at least one of the one or more perception algorithms and the application, or at least two of the perception algorithms, can be executed concurrently. The mobile computing device is further operative to estimate a probability of failure for at least one of the one or more perception algorithms. The probability of failure is estimated based on the estimated level of contention, respective current configurations of the one or more perception algorithms, a current configuration of the local computing resource, and the determined operating conditions. The mobile computing device is further operative, if the estimated probability of failure exceeds a failure threshold, to offload execution of the at least one perception algorithm to an external computing resource, else to execute the at least one perception algorithm on the local computing resource.

According to a second aspect of the invention, a method of controlling concurrent execution of perception algorithms is provided. The method is performed by a mobile computing device and comprises acquiring sensor data from one or more sensors. The acquired sensor data represents a physical environment in which the mobile computing device is located. The method further comprises executing an application which is dependent on one or more perception algorithms processing the acquired sensor data. The one or more perception algorithms are subject to respective perception-performance constraints and a power-consumption constraint. The method further comprises determining operating conditions of the mobile computing device which have an impact on perception performance and power consumption of the one or more perception algorithms. The method further comprises estimating a level of contention for a local computing resource comprised in the mobile computing device, on which local computing resource at least one of the one or more perception algorithms and the application, or at least two of the perception algorithms, can be executed concurrently. The method further comprises estimating a probability of failure for at least one of the one or more perception algorithms. The probability of failure is estimated based on the estimated level of contention, respective current configurations of the one or more perception algorithms, a current configuration of the local computing resource, and the determined operating conditions. The method further comprises, if the estimated probability of failure exceeds a failure threshold, offloading execution of the at least one perception algorithm to an external computing resource, else executing the at least one perception algorithm on the local computing resource.

According to a third aspect of the invention, a computer program is provided. The computer program comprises instructions which, when the computer program is executed by a mobile computing device, cause the mobile computing device to carry out the method according to an embodiment of the second aspect of the invention.

According to a fourth aspect of the invention, a computer-readable data carrier is provided. The computer-readable data carrier has stored thereon the computer program according to the third aspect of the invention.

According to a fifth aspect of the invention, a data carrier signal is provided. The data carrier signal carries the computer program according to the third aspect of the invention.

Even though advantages of the invention have in some cases been described with reference to embodiments of the first aspect of the invention, corresponding reasoning applies to embodiments of other aspects of the invention.

Further objectives of, features of, and advantages with, the invention will become apparent when studying the following detailed disclosure, the drawings, and the appended claims. Those skilled in the art realize that different features of the invention can be combined to create embodiments other than those described in the following.

BRIEF DESCRIPTION OF THE DRAWINGS

The above, as well as additional objects, features, and advantages of the invention, will be better understood through the following illustrative and non-limiting detailed description of embodiments of the invention, with reference to the appended drawings, in which.

Figure 1:
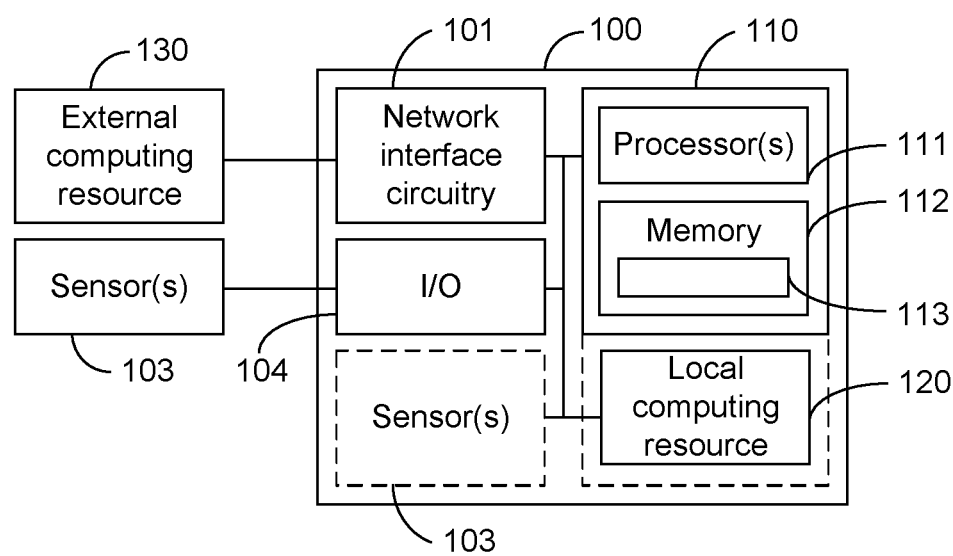
FIG. 1 schematically illustrates a mobile computing device for controlling concurrent execution of perception algorithms, in accordance with embodiments of the invention.

All the figures are schematic, not necessarily to scale, and generally only show parts which are necessary in order to elucidate the invention, wherein other parts may be omitted or merely suggested.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Conventional solutions for handling resource contention for concurrently executed processing tasks focus on allocation of processors, processors cores, memory, etc, to specific algorithms, and/or offloading of specific algorithms to external computing resources, such as edge or cloud computing resources. The present disclosure presents solutions which are tailored for handling resource contention in concurrent perception pipelines, i.e., computing resources executing multiple perception algorithms in a concurrent manner.

As an example, a use case is considered in which an AR/XR game or other application is executed on a mobile computing device which in its current state only requires execution of a SLAM algorithm. This may be the case because the game only requires the pose of the headset to be known. As the user enters another level of the game, the effects in the game become more dependent on the surrounding physical environment, and the game may require detection of objects such as walls, windows, furniture, people, etc. To accomplish this, a separate object-detection algorithm may be required, which typically is executed concurrently with the SLAM algorithm on a common computing resource of the mobile computing device, which is shared with the SLAM algorithm, and optionally also the game. The common computing resource may either be the Central Processing Unit (CPU) or an application processor which is used for executing an operating system and/or the game or other application relying on one or more perception algorithms, or a computing resource which is separate from the CPU and/or application processor, such as dedicated processing circuitry which is optimized for executing perception pipelines, e.g., a microprocessor, a Graphical Processing Unit (GPU), a Tensor Processing Unit (TPU), a Vision Processing Unit (VPU), an Application-Specific Integrated Circuit (ASIC), or a Field-Programmable Gate Array.

Further with reference to the above use case, the user of the mobile computing device may have set the device to a "power save" mode, which results in a maximum power level being imposed as a requirement or constraint on the device's computing resource. At the same time, a minimum pose accuracy, or corresponding performance measure, may be imposed as a requirement or constraint by the AR/XR game to guarantee proper functioning of the game, and/or to provide a sufficient quality of experience for the user while playing the game. It is noted that a power constraint is typically necessary to avoid exhausting the available computing resources, and/or draining the battery of the mobile computing device, by the perception algorithm(s).

Figure 2:
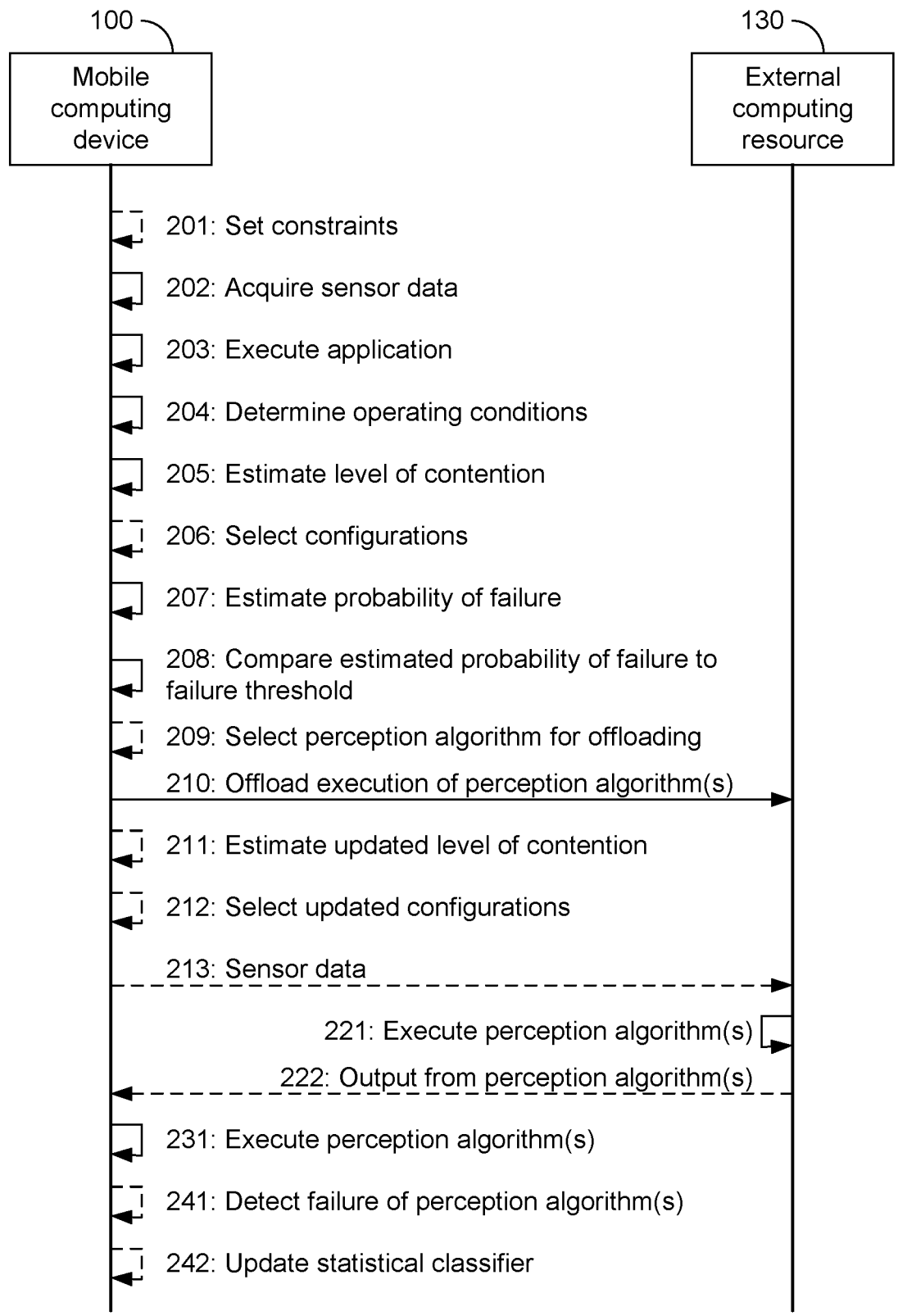
FIG. 2 is a sequence diagram illustrating controlling concurrent execution of perception algorithms, in accordance with embodiments of the invention.

In the following, embodiments 100 of the mobile computing device for controlling concurrent execution of perception algorithms are described, with reference to FIGS. 1 and 2. The mobile computing device 100 may, e.g., be any one of a smartphone, a mobile phone, a laptop, a tablet computer, a Head-Mounted Display (HMD), a drone, a robot (such as a robotic vacuum cleaner, a humanoid robot, or an agricultural robot), and an autonomous vehicle (such as a self-driving car).

The mobile computing device 100 comprises network interface circuitry 101 and processing circuitry 110.

The network interface circuitry 101 may comprise one or more of a cellular modem (e.g., GSM, UMTS, LTE, 5G, or higher generation), a WLAN/Wi-Fi modem, a Bluetooth modem, an Ethernet interface, an optical interface, or the like, for exchanging data between the mobile computing device 100 and an external computing resource 130, described further below, other mobile computing devices, the Internet, etc.

The processing circuitry 110 may comprise one or more processors 111, such as CPUs, microprocessors, application processors, application-specific processors, GPUs, TPUs, VPUs, and Digital Signal Processors (DSPs) including image processors, or a combination thereof, and a memory 112 comprising a computer program 113 comprising instructions. When executed by the processor(s) 111, the computer program 113 causes the mobile computing device 100 to become operative in accordance with embodiments of the invention described herein. The memory 112 may, e.g., be a Random-Access Memory (RAM), a Read-Only Memory (ROM), a Flash memory, or the like. The computer program 113 may be downloaded to the memory 112 by means of the network interface circuitry 101, as a data carrier signal carrying the computer program 113. The processing circuitry 110 may alternatively or additionally comprise one or more ASICs, FPGAs, or the like, which are operative to cause the mobile computing device 100 to become operative in accordance with embodiments of the invention described herein.

More specifically, the mobile computing device 100 is operative to acquire 202 sensor data from one or more sensors 103. The acquired sensor data represents a physical environment in which the mobile computing device 100 is located, and through which the mobile computing device 100 may move. The one or more sensors 103 capture sensor data, either autonomously or on request, periodically or occasionally, and make the captured sensor data, either in raw format or pre-processed, available for further processing, e.g., by one or more perception algorithms described in further detail below. The captured sensor data represents features of the physical environment. In the present context, features are to be understood as properties of the environment which can be captured by the one or more sensors 103, e.g., in the form of a 2D image, a 3D point cloud, or the like, or parts thereof (e.g., a set of pixels or points). These features can, e.g., be described by a "descriptor" which can be efficiently compressed and saved as part of a map representing the physical environment.

The one or more sensors 103 may optionally be comprised in the mobile computing device 100. Alternatively, the one or more sensors 103 may be separate from the mobile computing device 100 and operatively connected to the mobile computing device 100, via a wired or wireless interface, such as the network interface circuitry 101 or one or more interface circuitries 104 ("I/O" in FIG. 1), such as USB, Bluetooth, Lighting, or the like. The one or more sensors 103 comprise one or more of a visual sensor (such as monocular cameras, stereo cameras, or multiple-camera systems), a depth sensor (such as Lidar), and an inertial sensor (such as an Inertial Measurement Unit (IMU), which typically comprises an accelerometer and a gyroscope).

The mobile computing device 100 is further operative to execute 203 an application which is dependent on one or more perception algorithms which processes the acquired sensor data. In the present context, being dependent on one or more perception algorithms means that the application, i.e., a software or computer program, receives results from the one or more perception algorithms and uses the received results as inputs to control the application. The application which is dependent on the one or more perception algorithms may be any one of a VR application, an AR application, an MR application, an XR application, and a navigation application, such as the AR/XR game of the use case described above.

The one or more perception algorithms use the acquired 202 sensor data as input. Typically, data from one sensor 103 or multiple sensors 103 of the same type are used as input for a specific perception algorithm, but data from a specific sensor 103 or multiple sensors 103 of the same specific type may also be used as input for more than one perception algorithm, and a specific perception algorithm may use data from more than one sensor 103 or sensors 103 of more than one type as input. The one or more perception algorithms comprise one or more of a localization algorithm, a mapping algorithm, a localization-and-mapping algorithm (such as Simultaneous Localization And Mapping (SLAM)), an object-detection algorithm, an object-classification algorithm, a segmentation algorithm, a scene-recognition algorithm, a gesture-recognition algorithm, and a 3D-reconstruction algorithm, which are known in the art.

The one or more perception algorithms are subject to respective perception-performance constraints and a power-consumption constraint. The perception-performance constraints are typically specific to a type of algorithm, but may also be specific to a single algorithm if multiple perception algorithms of the same type are utilized. The perception-performance constraints are typically minimum or maximum values, i.e., thresholds that should be exceeded or not exceeded by a perception algorithm for the application to provide a satisfactory user experience and/or performance. In other words, they reflect a desired performance of the perception algorithms. For example, typical perception-performance constraints for the perception algorithms listed above are: localization accuracy, localization latency, and localization error, for localization algorithms, mapping accuracy, mapping latency, and mapping error, for mapping algorithms, localization-and-mapping accuracy, localization-and-mapping latency, and localization-and-mapping error, for localization-and-mapping algorithms (such as SLAM), detection precision, detection latency, and detection error, for object-detection algorithms, classification precision, classification latency, and classification error, for object-classification algorithms, segmentation precision, segmentation latency, and segmentation error, for segmentation algorithms, recognition precision, recognition latency, and recognition, for scene-recognition algorithms, recognition precision, recognition latency, and recognition, for gesture-recognition algorithms, and 3D-model accuracy, 3D-reconstruction latency, and 3D-reconstruction error, for 3D-reconstruction algorithms.

The power-consumption constraint may either apply for the total power consumption of all perception algorithms, and optionally also the application, but may alternatively be specific for a single perception algorithm, a group of perception algorithms, or all perception algorithms of a specific type. For instance, certain types of perception algorithms may share a power-consumption budget. The power-consumption constraint is typically a value for the maximum power consumption, measured in Watts or an equivalent unit.

The respective perception-performance constraints and/or the power-consumption constraint may be controlled by the application which is dependent on the one or more perception algorithms. Such constraints may either be configured by a provider of the application, or a user of the mobile computing device 100.

The mobile computing device 100 is further operative to determine 204 operating conditions of the mobile computing device 100. These are operating conditions which have an impact on the perception performance and/or the power consumption of the one or more perception algorithms. Typically, such operating conditions are related to the physical environment in which the mobile computing device 100 is located or through which the mobile computing device 100 moves, or operating conditions which are related to operation of the mobile computing device 100. For example, the operating conditions may comprise one or more of a brightness of the physical environment in which the mobile computing device 100 is located or moves, an amount of structural and/or visual features in the physical environment which can be captured by the one or more sensors 103, and a velocity of the mobile computing device 100. The velocity of the mobile computing device 100 may be the linear velocity of the mobile computing device 100 when moving through the physical environment and/or the angular velocity of the mobile computing device 100, i.e., the change in pose or orientation of the mobile computing device 100. For example, perception algorithms processing sensor data captured by visual sensors 103 typically perform better in bright environments and in environments with substantially constant illumination. As another example, perception algorithms used for object detection or object classification typically perform more accurately and with lower latency in environments containing fewer objects, in environments containing objects with distinct structural/visual features, and in environments where objects move with low (linear and/or angular) velocity. As yet a further example, an increased linear velocity of the mobile computing device 100 moving through the physical environment, or an increased angular velocity (i.e., a change in pose or orientation) of the mobile computing device 100, typically results in a reduced performance of perception algorithms.

The mobile computing device 100 may be operative to determine 204 current or future operating conditions of the mobile computing device 100. Future operating conditions may be estimated based on a known route or trajectory of the mobile computing device 100 and known operating conditions at future locations, e.g., using an existing map which may have been created, and may be updated, in a collaborative manner using sensor data captured by other mobile computing devices. Future operating conditions may also be determined by using sensors 103 which have an extended range compared to other sensors 103. The time period for which future operating conditions are estimated may be set based on trial and error but is typically in the range of a few seconds up to a few tens of seconds.

The mobile computing device 100 is further operative to estimate 205 a level of contention for a local computing resource 120 on which at least one of the one or more perception algorithms and the application, or at least two of the perception algorithms, can be executed concurrently. Contention may arise between two or more perception algorithms, or between one or more perception algorithms and the application, if they are executed on a common computing resource, i.e., sharing common hardware such as processors, processor cores, RAM, cache memory, disk storage, etc. The estimated level of contention may be a current level of contention or a predicted level of contention.

Estimating a level of contention for multiple applications and/or algorithms running concurrently in a computing platform, such as the local computing resource 120, is an active field of research, and different ways of estimating a level of contention are known. For instance, for computing platforms which are based on a virtualized environment such as VMWare, "CPU ready" is provided as a measure of CPU contention which can be used for controlling execution of perception algorithms as described herein. VMWare has defined "CPU ready time" as the time a virtual machine must wait in a ready-to-run state before it can be scheduled on a CPU. Correspondingly, "CPU ready" is the percentage of time that a virtual machine was ready but could not be scheduled to run on a physical CPU. A value of "CPU ready" above 10% may be considered critical, and a goal should be to keep "CPU ready" below 5% for good operating conditions. "CPU ready" is considered to be a de facto standard (see, e.g., V. van Beek, G. Oikonomou, and A. Iosup, "A CPU Contention Predictor for Business-Critical Workloads in Cloud Datacenters", in 2019 IEEE 4th International Workshops on Foundations and Applications of Self* Systems (FAS*W), pages 56-61, IEEE, 2019).

An alternative way of estimating a level of contention is to measure the resource usage of a single application or algorithm when executed alone on the computing platform. In this way, the resource usage of single algorithms or applications can be measured separately. For example, one can measure the processor usage and/or memory usage, either in absolute values or percentages, as reported by the computing platform's resource monitor. Then, the total resource usage of multiple applications and/or algorithm running concurrently on the computing platform can be obtained by summing the individual resource usage values. If the total resource usage of one or more concurrently executed processes (operating-system processes, applications, perception algorithms, etc) is more than 100%, contention will occur. One may also define the threshold for resource usage above which contention is likely to occur based on a current resource usage of one or more concurrently executed processes in the event that an additional process (such as a perception algorithms) is started on the same computing resource. Such a threshold may be set to a value below the maximum available capacity, e.g., 90%, and is typically set based on experiments.

A further alternative for estimating a level of contention is to determine the impact of perception algorithms which are executed concurrently have on each of the constraints, both on their respective perception-performance constraints and the power consumption constraint(s). As an example, a linear model may be used to define a function estimating the level of contention C as $$C = a \cdot accuracy_{min} + b \cdot latency_{max} + c \cdot power_{max},$$

where a+b+c=1.

The coefficients a, b, and c, may be determined by measuring the contention C with varying constraints $accuracy_{min}$, $latency_{max}$, and $power_{max}$, and fitting the obtained data to the above equation. Such a procedure for modelling the level of contention of a specific computing platform, such as the local computing resource 120, may ether be performed during operation of the mobile computing device 100, or offline, e.g., in a testbed under controlled operating conditions. It will also be appreciated that the model may be refined during operation, optionally in a collaborative manner by collecting measurements of contention and related information about constraints from multiple mobile computing devices.

The local computing resource 120 is comprised in the mobile computing device 100. The local computing resource 120 may optionally be the processing circuitry 110, i.e., the one or more perception algorithms and the application which is dependent on the one or more perception algorithms are executed on the processing circuitry 110. Optionally, one or more processors or processor cores of the processor(s) 111 may be dedicated for executing the one or more perception algorithms and/or the application which is dependent on the one or more perception algorithms. As a further alternative, the local computing resource 120 may be a separate processing circuitry or processing unit, such as a microprocessor, a GPU, a TPU, a VPU, an ASIC, an FPGA, a DSP, or other processor architecture which is optimized for perception algorithms in general, or for a specific type or specific types of perception algorithms. Such a computing resource which is dedicated for executing perception algorithms is also known as "perception pipeline".

The mobile computing device 100 is further operative to estimate 207 a probability of failure for at least one of the one or more perception algorithms. The probability of failure is estimated 207 based on the estimated 205 level of contention, respective current configurations of the one or more perception algorithms, a current configuration of the local computing resource, and the determined 204 operating conditions. The mobile computing device 100 may be operative to estimate 207 the probability of failure for the at least one perception algorithm using a classifier, e.g., a statistical classifier. The probability of failure may, e.g., be determined via offline analysis by performing multiple runs of the perception algorithm, and training a statistical classifier based on the obtained data. Alternatively, the statistical classifier may be trained during operation of the mobile computing device 100. The thereby trained statistical classifier can subsequently be used for estimating 207 the probability of failure for the at least one perception algorithm given the current or future estimated 205 level of contention, respective current configurations of the one or more perception algorithms, a current configuration of the local computing resource, and the determined 204 operating conditions. Statistical classifiers are known in the art, e.g., XGBoost (https://xgboost.readthedocs.io/en/latest/index.html) which is a decision tree-based method (T. Chen and C. Guestrin, "XGBoost: A Scalable Tree Boosting System", in Proceedings of the 22nd ACM SIGKDD International Conference on Knowledge Discovery and Data Mining, pages 785-794, ACM, 2016).

The mobile computing device 100 may further be operative to update 242 the statistical classifier based on detected 241 failures of the one or more perception algorithms. In the present context, a failure of a perception algorithm may, e.g., be an error condition of the perception algorithm being fulfilled. In particular, the error condition may relate to an unrecoverable error. Examples for error conditions related to the execution of perception algorithms are:
 A latency or delay in the execution of the perception algorithm, or a part thereof, e.g., a sub-routine, exceeding a threshold, i.e., the algorithm does not terminate within a certain time constraint.
 An iterative algorithm does not converge within a certain number of iterations.
 A lack of computing resources, such as processor cycles or memory, to execute an algorithm or a part thereof.
These types of errors are typically caught by implementations of algorithms, to detect unacceptable conditions.

In addition, error conditions may also relate to a failure of perception algorithms to meet its perception-performance constraint, or a perception algorithm causing failure to meet the power-consumption constraint.

The mobile computing device 100 may further be operative to update 242 the statistical classifier based on one or more of a current level of contention when a failure occurred, the respective current configurations of the one or more perception algorithms, the current configuration of the local computing resource when the failure occurred, and current operating conditions when the failure occurred.

The mobile computing device 100 is further operative to offload 210 execution of the at least one perception algorithm to an external computing resource 130 if the estimated 207 probability of failure exceeds a failure threshold. Else, i.e., if the estimated 207 probability of failure does not exceed a failure threshold, the mobile computing device 100 is operative to execute 231 the at least one perception algorithm on the local computing resource 120.

The external computing resource 130 may be an edge or cloud computing resource which is accessible by the mobile computing device 100 via the network interface circuitry 101, e.g., through a cellular network or via a WLAN/Wi-Fi network to which the mobile computing device 100 is connected. The external computing resource 130 is typically more powerful, or less constrained, in terms of processing power and hardware resources, such as the number of processors or processor cores, memory, processor speed, etc, as compared to the local computing resource 120 comprised in the mobile computing device 100.

The other perception algorithms of the one or more perception algorithms, for which the probability of failure does not exceed the failure threshold, may be executed 231 on the local computing resource 120. Correspondingly, if the local computing 120 resource is separate from the processing circuitry 110, the application which is dependent on the one or more perception algorithms may either be executed 203 on the local computing resource 120 or on the processing circuitry 110.

The mobile computing device 100 may further be operative, if execution of the at least one perception algorithm is offloaded 210 to the external computing resource 130, to initiate execution 221 of the at least one perception algorithm on the external computing resource 130. The offloaded perception algorithm may either be available to, or accessible by, the external computing resource 130, e.g., stored in a local memory of the external computing resource 130 or in a storage accessible by the external computing resource 130 for download, or may be transmitted from the mobile computing device 100 to the external computing resource 130, e.g., in connection with offloading 210 execution of the at least one perception algorithm to the external computing resource 130.

The mobile computing device 100 may further be operative, if execution of the at least one perception algorithm is offloaded 210 to the external computing resource 130, to transmit 213 at least part of the acquired 202 sensor data to the external computing resource 130, and to receive 222 output from the perception algorithm executed 221 on the external computing resource 130 from the external computing resource 130. The at least part of the acquired 202 sensor data which is transmitted 213 to the external computing resource 130 is used as input to the at least one perception algorithm executed 221 on the external computing resource 130.

The mobile computing device 100 may further be operative to select 206, prior to estimating 207 a probability of failure for at least one of the one or more perception algorithms, the respective current configurations of the one or more perception algorithms and the current configuration of the local computing resource 120. The respective current configurations of the one or more perception algorithms and the current configuration of the local computing resource 120 are selected 206 based on the estimated 205 level of contention and the determined 204 operating conditions. This can be achieved by selecting a current configuration from a list of existing configurations, which may either be static (i.e., the configurations define values for parameters controlling the one or more perception algorithms and the local computing resource 120, respectively) or dynamic (i.e., the configurations define rules for parameters controlling the one or more perception algorithms and the local computing resource 120, respectively, which rules may be based on one or more other parameters). The configurations which are selected 206 so as to achieve the set 201 respective perception-performance constraints and the power-consumption constraint. That is, when the perception algorithm(s) is/are executed 231 with the selected 206 configurations on the local computing resource 120, which is configured with the selected 206 configuration for the local computing resource 120, the respective perception-performance constraints and the power-consumption constraint should be met.

The mobile computing device 100 may further be operative, if execution of the at least one perception algorithm is offloaded 210 to the external computing resource 130, to estimate 211 an updated level of contention for the local computing resource 120, and to select 212 updated respective current configurations of the one or more perception algorithms and an updated current configuration of the local computing resource 120. The estimated 211 updated level of contention is the estimated level of contention for the perception algorithm(s) which is/are not offloaded 210 but are executed 231 on the local computing resource 120. The updated respective current configurations of the one or more perception algorithms and the updated current configuration of the local computing resource 120 are selected 212 based on the estimated 211 updated level of contention and the determined 204 operating conditions. Similar to what is described above in relation to selecting 206 the respective current configurations of the one or more perception algorithms and the current configuration of the local computing resource 120 prior to estimating 207 a probability of failure for at least one of the one or more perception algorithms, the updated respective current configurations of the one or more perception algorithms and the updated current configuration of the local computing resource 120 may be selected 212 from a list of existing configurations, which may either be static (i.e., the configurations define values for parameters controlling the one or more perception algorithms and the local computing resource 120, respectively) or dynamic (i.e., the configurations define rules for parameters controlling the one or more perception algorithms and the local computing resource 120, respectively, which rules may be based on one or more other parameters and/or conditions, e.g., operating conditions of the mobile computing device 100). The updated configurations are selected 212 so as to achieve the set 201 respective perception-performance constraints and the power-consumption constraint. That is, when the perception algorithm(s) which is/are not offloaded is/are executed 231 with the selected 212 updated configurations on the local computing resource 120, which is configured with the selected 212 updated configuration for the local computing resource 120, the respective perception-performance constraints and the power-consumption constraint should be met.

The mobile computing device 100 may further be operative to select 209 the at least one perception algorithm for offloading 210 to the external computing resource 130 based on one or more of: a contribution of the at least one perception algorithm to the estimated 207 probability of failure, a contribution of the at least one perception algorithm to the estimated 205 level of contention for the local computing resource 120, a latency requirement of the at least one perception algorithm, and a power consumption of the at least one perception algorithm.

For example, the mobile computing device 100 may be operative to select 209 the at least one perception algorithm for offloading 210 to the external computing resource 130 as the perception algorithm which has the largest impact on the estimated 207 probability of failure for the at least one perception algorithm. The impact in terms of increase in failure probability which each of the one or more perception algorithms has on the estimated failure probability may be obtained as an output from the classifier described hereinbefore.

As another example, the mobile computing device 100 may be operative to select 209 the at least one perception algorithm for offloading 210 to the external computing resource 130 as the perception algorithm which has the potential to cause the largest increase in contention, i.e., is expected to have the largest resource usage in terms of processor resources and/or memory. For example, if two perception algorithms would result in substantially the same probability of failure which exceeds the failure threshold, the perception algorithm which causes the largest increase in contention is selected for offloading 210 to the external computing resource 130. Advantageously, this increases robustness, since an increased contention typically increases the risk for failure, even if two perception algorithms contribute to the probability of failure by the same amount. This is due to the fact that other variables, such as the algorithm configuration, location of the mobile computing device 100, and predicted operating conditions, impact the probability of failure.

As a further example, the mobile computing device 100 may be operative to select 209 the at least one perception algorithm for offloading 210 to the external computing resource 130 by excluding perception algorithms from offloading 210 which require the lowest latency among the one or more perception algorithms. For example, if the application requires the SLAM output to be the one with the lowest latency, since the pose of the mobile computing device 100 must be computed with a low latency, the SLAM algorithm would be excluded from offloading 210 and would be executed 231 on the local computing resource 120 instead, such that its latency is not negatively impacted by latency caused by communication with the external computing resource 130 via the network interface circuitry 101.

As yet a further example, the mobile computing device 100 may further be operative to select 209 the at least one perception algorithm for offloading 210 to the external computing resource 130 by excluding perception algorithms from offloading 210 which have the lowest power consumption among the one or more perception algorithms. This is advantageous in that the lifetime of the power source of the mobile computing device 100, which typically is battery-powered, is prolonged.

Figure 3:
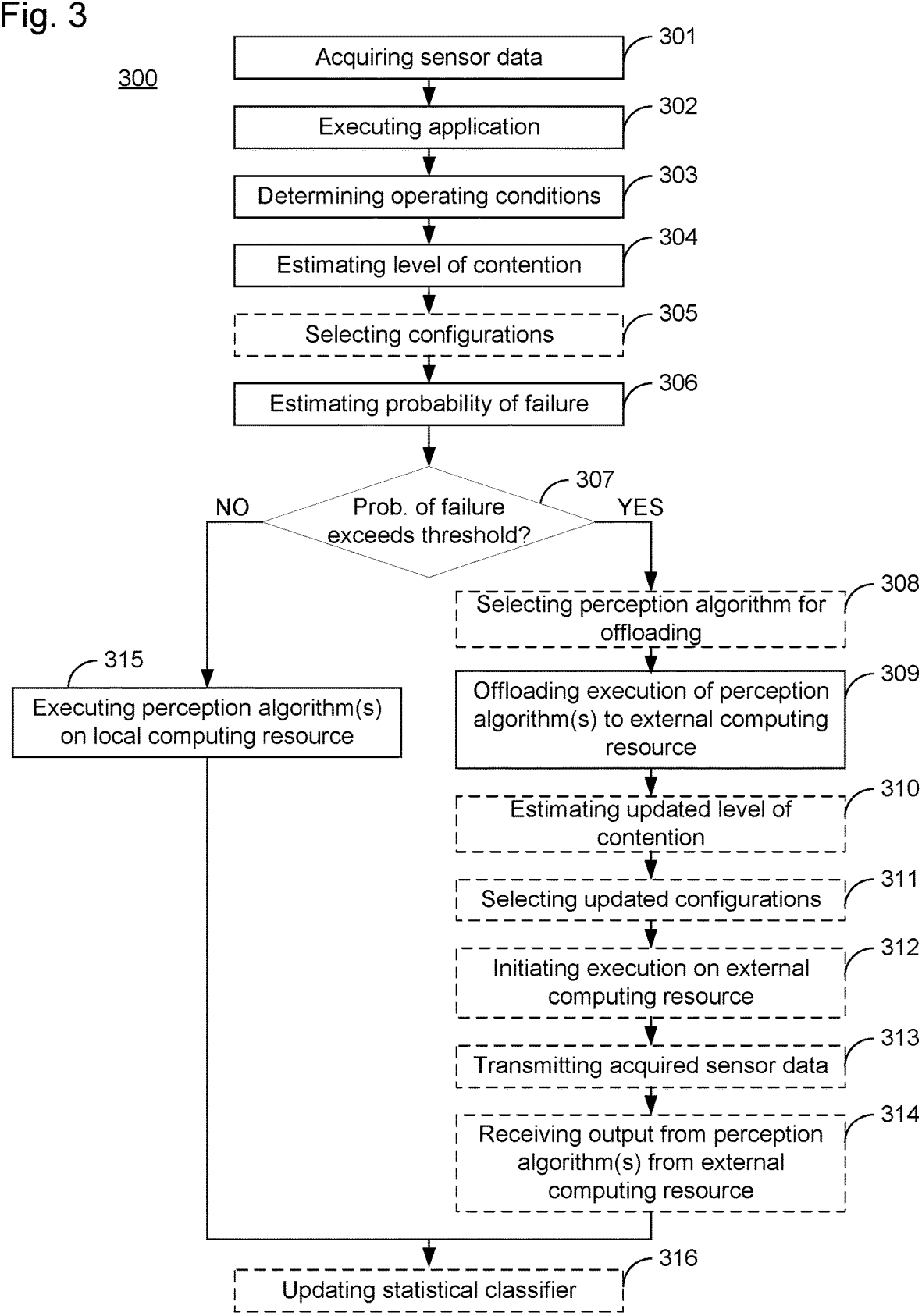
FIG. 3 shows a method of controlling concurrent execution of perception algorithms, in accordance with embodiments of the invention.

In the following, embodiments of the method 300 of controlling concurrent execution of perception algorithms are described with reference to FIG. 3.

The method 300 is performed by a mobile computing device 100 and comprises acquiring 301 sensor data from one or more sensors 103. The acquired sensor data represents a physical environment in which the mobile computing device 100 is located. The one or more sensors may, e.g., comprise one or more of: a Lidar, a visual sensor, a depth sensor, and an inertial sensor.

The method 300 further comprises executing 302 an application which is dependent on one or more perception algorithms processing the acquired sensor data. The one or more perception algorithms are subject to respective perception-performance constraints and a power-consumption constraint. The respective perception-performance constraints and/or the power-consumption constraint may be controlled by the application which is dependent on the one or more perception algorithms. The application which is dependent on the one or more perception algorithms may, e.g., be any one of: a VR application, an AR application, an MR application, an XR application, and a navigation application. The one or more perception algorithms may, e.g., comprise one or more of: a localization algorithm, a mapping algorithm, a localization-and-mapping algorithm, an object-detection algorithm, an object-classification algorithm, a segmentation algorithm, a scene-recognition algorithm, a gesture-recognition algorithm, and a 3D-reconstruction algorithm.

The method 300 further comprises determining 303 operating conditions of the mobile computing device 100 which have an impact on perception performance and power consumption of the one or more perception algorithms. The operating conditions may, e.g., comprise one or more of: a brightness of the physical environment in which the mobile computing device is located, an amount of structural and/or visual features in the physical environment which can be captured by the one or more sensors, and a velocity (both linear and angular velocity) of the mobile computing device.

The method 300 further comprises estimating 304 a level of contention for a local computing resource 120 comprised in the mobile computing device 100, on which at least one of the one or more perception algorithms and the application, or at least two of the perception algorithms, can be executed concurrently.

The method 300 further comprises estimating 306 a probability of failure for at least one of the one or more perception algorithms. The probability of failure is estimated 306 based on the estimated level of contention, respective current configurations of the one or more perception algorithms, a current configuration of the local computing resource 120, and the determined operating conditions.

The method 300 further comprises, if the estimated probability of failure exceeds 307 a failure threshold ("YES" in FIG. 3), offloading 309 execution of the at least one perception algorithm to an external computing resource 130, else ("NO" in FIG. 3) executing 315 the at least one perception algorithm on the local computing resource 120. The external computing resource 130 may be an edge or cloud computing resource.

The probability of failure for the at least one perception algorithm may be estimated using a statistical classifier. Optionally, the method 300 may further comprise updating 316 the statistical classifier based on detected failures of the one or more perception algorithms. The statistical classifier may, e.g., be updated based on one or more of: a current level of contention when a failure occurred, the respective current configurations of the one or more perception algorithms, the current configuration of the local computing resource when the failure occurred, and current operating conditions when the failure occurred.

A failure of a perception algorithm may comprise any one of: an error condition of the perception algorithm, a perception algorithm failing to meet its perception-performance constraint, and a perception algorithm causing failure to meet the power-consumption constraint.

The method 300 may further comprise selecting 308 the at least one perception algorithm for offloading 309 to the external computing resource 130 based on one or more of: a contribution of the at least one perception algorithm to the estimated 207 probability of failure, a contribution of the at least one perception algorithm to the estimated 205 level of contention for the local computing resource 120, a latency requirement of the at least one perception algorithm, and a power consumption of the at least one perception algorithm.

The method 300 may further comprise selecting 305, prior to estimating 306 a probability of failure for at least one of the one or more perception algorithms, the respective current configurations of the one or more perception algorithms and the current configuration of the local computing resource 120. The respective current configurations of the one or more perception algorithms and the current configuration of the local computing resource 120 are selected 305 based on the estimated 304 level of contention and the determined 303 operating conditions.

The method 300 may further comprise, if execution of the at least one perception algorithm is offloaded to the external computing resource, estimating 310 an updated level of contention for the local computing resource, and selecting 311 updated respective current configurations of the one or more perception algorithms and an updated current configuration of the local computing resource 120. The updated respective current configurations of the one or more perception algorithms and the updated current configuration of the local computing resource 120 are selected based on the estimated 310 updated level of contention and the determined 303 operating conditions.

The method 300 may further comprise, if execution of the at least one perception algorithm is offloaded to the external computing resource 130, initiating 312 execution of the at least one perception algorithm on the external computing resource 130, transmitting 313 at least part of the acquired sensor data to the external computing resource 130, and receiving 314 output from the perception algorithm executed on the external computing resource 130 from the external computing resource 130. The part of the acquired sensor data which is transmitted to the external computing resource 130 is used as input to the at least one perception algorithm executed on the external computing resource 130.

It will be appreciated that the method 300 may comprise additional, alternative, or modified, steps in accordance with what is described throughout this disclosure.

An embodiment of the method 300 may be implemented as the computer program 113 comprising instructions which, when the computer program 113 is executed by a computing device, such as the mobile computing device 100, cause the mobile computing device 100 to carry out the method 300 and become operative in accordance with embodiments of the invention described herein. The computer program 113 may be stored in a computer-readable data carrier, such as the memory 112. Alternatively, the computer program 113 may be carried by a data carrier signal, e.g., downloaded to the memory 112 via the network interface circuitry 101.

The person skilled in the art realizes that the invention by no means is limited to the embodiments described above. On the contrary, many modifications and variations are possible within the scope of the appended claims.

The invention claimed is:

1. A mobile computing device for controlling concurrent execution of perception algorithms, the mobile computing device comprising:
   network interface circuitry, and
   processing circuitry,
   the mobile computing device operative to:
   acquire sensor data from one or more sensors, the acquired sensor data representing a physical environment in which the mobile computing device is located,
   execute an application which is dependent on one or more perception algorithms processing the acquired sensor data, the one or more perception algorithms being subject to respective perception-performance constraints and a power-consumption constraint, determine operating conditions of the mobile computing device which have an impact on perception performance and power consumption of the one or more perception algorithms, estimate a level of contention for a local computing resource on which at least one of the one or more perception algorithms and the application, or at least two of the perception algorithms, can be executed concurrently, estimate a probability of failure for at least one of the one or more perception algorithms based on the estimated level of contention, respective current configurations of the one or more perception algorithms, a current configuration of the local computing resource, and the determined operating conditions, if the estimated probability of failure exceeds a failure threshold, offload execution of the at least one perception algorithm to an external computing resource, and if the estimated probability of failure does not exceed the failure threshold, execute the at least one perception algorithm on the local computing resource.

2. The mobile computing device according to claim 1, further operative to select the at least one perception algorithm for offloading to the external computing resource based on one or more of: a contribution of the at least one perception algorithm to the estimated probability of failure, a contribution of the at least one perception algorithm to the estimated level of contention for the local computing resource, a latency requirement of the at least one perception algorithm, and a power consumption of the at least one perception algorithm.

3. The mobile computing device according to claim 1, operative to estimate the probability of failure for the at least one perception algorithm using a statistical classifier.

4. The mobile computing device according to claim 3, further operative to update the statistical classifier based on detected failures of the one or more perception algorithms.

5. The mobile computing device according to claim 4, operative to update the statistical classifier based on one or more of: a current level of contention when a failure occurred, the respective current configurations of the one or more perception algorithms, the current configuration of the local computing resource when the failure occurred, and current operating conditions when the failure occurred.

6. The mobile computing device according to claim 1, wherein a failure of a perception algorithm comprises any one of: an error condition of the perception algorithm, a perception algorithm failing to meet its perception-performance constraint, and a perception algorithm causing failure to meet the power-consumption constraint.

7. The mobile computing device according to claim 1, further operative to select, prior to estimating a probability of failure for at least one of the one or more perception algorithms, the respective current configurations of the one or more perception algorithms and the current configuration of the local computing resource based on the estimated level of contention and the determined operating conditions.

8. The mobile computing device according to claim 1, further operative to, if execution of the at least one perception algorithm is offloaded to the external computing resource:

estimate an updated level of contention for the local computing resource, and select updated respective current configurations of the one or more perception algorithms and an updated current configuration of the local computing resource based on the estimated updated level of contention and the determined operating conditions.

9. The mobile computing device according to claim 1, wherein the respective perception-performance constraints and/or the power-consumption constraint are controlled by the application which is dependent on the one or more perception algorithms.

10. The mobile computing device according to claim 1, further operative to, if execution of the at least one perception algorithm is offloaded to the external computing resource:

initiate execution of the at least one perception algorithm on the external computing resource, transmit at least part of the acquired sensor data to the external computing resource, which part of the acquired sensor data is used as input to the at least one perception algorithm executed on the external computing resource, and receive output from the perception algorithm executed on the external computing resource from the external computing resource.

11. The mobile computing device according to claim 1, wherein the operating conditions comprise one or more of: a brightness of the physical environment in which the mobile computing device is located, an amount of structural and/or visual features in the physical environment which can be captured by the one or more sensors, and a velocity of the mobile computing device.

12. The mobile computing device according to claim 1, wherein the one or more perception algorithms comprise one or more of: a localization algorithm, a mapping algorithm, a localization-and-mapping algorithm, an object-detection algorithm, an object-classification algorithm, a segmentation algorithm, a scene-recognition algorithm, a gesture-recognition algorithm, and a 3D-reconstruction algorithm.

13. The mobile computing device according to claim 1, wherein the one or more sensors comprise one or more of: a Lidar, a visual sensor, a depth sensor, and an inertial sensor.

14. The mobile computing device according to claim 1, comprising the one or more sensors.

15. The mobile computing device according to claim 1, wherein the application which is dependent on the one or more perception algorithms is any one of: a Virtual-Reality (VR), an Augmented-Reality (AR), a Mixed-Reality (MR), or an extended-Reality (XR), application, and a navigation application.

16. The mobile computing device according to claim 1, wherein the external computing resource is an edge or cloud computing resource.

17. The mobile computing device according to claim 1, being any one of: a smartphone, a mobile phone, a laptop, a tablet computer, a Head-Mounted Display (HMD), a drone, a robot, and an autonomous vehicle.

18. A method of controlling concurrent execution of perception algorithms, the method performed by a mobile computing device and comprising:

acquiring sensor data from one or more sensors, the acquired sensor data representing a physical environment in which the mobile computing device is located, executing an application which is dependent on one or more perception algorithms processing the acquired sensor data, the one or more perception algorithms being subject to respective perception-performance constraints and a power-consumption constraint, determining operating conditions of the mobile computing device which have an impact on perception performance and power consumption of the one or more perception algorithms, estimating a level of contention for a local computing resource comprised in the mobile computing device, on which local computing resource at least one of the one or more perception algorithms and the application, or at least two of the perception algorithms, can be executed concurrently, estimating a probability of failure for at least one of the one or more perception algorithms based on the estimated level of contention, respective current configurations of the one or more perception algorithms, a current configuration of the local computing resource, and the determined operating conditions, and offloading execution of the at least one perception algorithm to an external computing resource, or executing the at least one perception algorithm on the local computing resource, depending respectively on whether or not the estimated probability of failure exceeds a failure threshold.

19. The method according to claim 18, further comprising selecting the at least one perception algorithm for offloading to the external computing resource based on one or more of: a contribution of the at least one perception algorithm to the estimated probability of failure, a contribution of the at least one perception algorithm to the estimated level of contention for the local computing resource, a latency requirement of the at least one perception algorithm, and a power consumption of the at least one perception algorithm.

20. A non-transitory computer-readable medium on which is stored a computer program comprising instructions which, when the computer program is executed by a mobile computing device, causes the mobile computing device to:

acquire sensor data from one or more sensors, the acquired sensor data representing a physical environment in which the mobile computing device is located, execute an application which is dependent on one or more perception algorithms processing the acquired sensor data, the one or more perception algorithms being subject to respective perception-performance constraints and a power-consumption constraint, determine operating conditions of the mobile computing device which have an impact on perception performance and power consumption of the one or more perception algorithms, estimate a level of contention for a local computing resource on which at least one of the one or more perception algorithms and the application, or at least two of the perception algorithms, can be executed concurrently, estimate a probability of failure for at least one of the one or more perception algorithms based on the estimated level of contention, respective current configurations of the one or more perception algorithms, a current configuration of the local computing resource, and the determined operating conditions, if the estimated probability of failure exceeds a failure threshold, offload execution of the at least one perception algorithm to an external computing resource, and if the estimated probability of failure does not exceed the failure threshold, execute the at least one perception algorithm on the local computing resource.

* * * * *